United States Patent [19]
Irimajiri

[11] 3,867,914
[45] Feb. 25, 1975

[54] DEVICE FOR ACCELERATING FUEL VAPORIZATION IN AN INTERNAL COMBUSTION ENGINE

[75] Inventor: Shoichiro Irimajiri, Kawagoe, Japan

[73] Assignee: Honda Giken Kogyo Kabushiki Kaisha, Tokyo, Japan

[22] Filed: June 29, 1973

[21] Appl. No.: 374,866

[30] Foreign Application Priority Data
June 30, 1972  Japan.............................. 47-77417

[52] U.S. Cl......... 123/75 B, 123/32 ST, 123/32 SP, 123/122 A, 123/122 AB, 123/127, 123/52 M
[51] Int. Cl. ..................... F02b 19/10, F02b 19/18
[58] Field of Search ......... 123/127, 122 A, 122 AB, 123/122 AC, 32 SPA:32 ST, 52 M, 75 B

[56] References Cited
UNITED STATES PATENTS

| | | | |
|---|---|---|---|
| 2,110,191 | 3/1938 | Bagnulo.......................... | 123/32 SPA |
| 3,382,856 | 5/1968 | McIlroy ............................ | 123/127 |
| 3,659,564 | 5/1972 | Suzuki.......................... | 123/32 SPA |

*Primary Examiner*—Charles J. Myhre
*Assistant Examiner*—Ronald B. Cox
*Attorney, Agent, or Firm*—Lyon & Lyon

[57] ABSTRACT

In an internal combustion engine of the type having a main combustion chamber supplied with a lean mixture and an auxiliary combustion chamber supplied with a rich mixture, a spark plug in the auxiliary chamber ignites the rich mixture and the resulting flame passes through a torch nozzle to ignite the lean mixture in the main chamber. The intake passage which supplies the auxiliary chamber with the rich mixture is integrally formed in the interior of the exhaust passage which comes from the main chamber, the heat of the exhaust thereby heating the fuel mixture to vaporize it so as to improve the starting performance of the engine and at the same time to reduce the emission of harmful air polluting ingredients in the exhaust.

3 Claims, 2 Drawing Figures

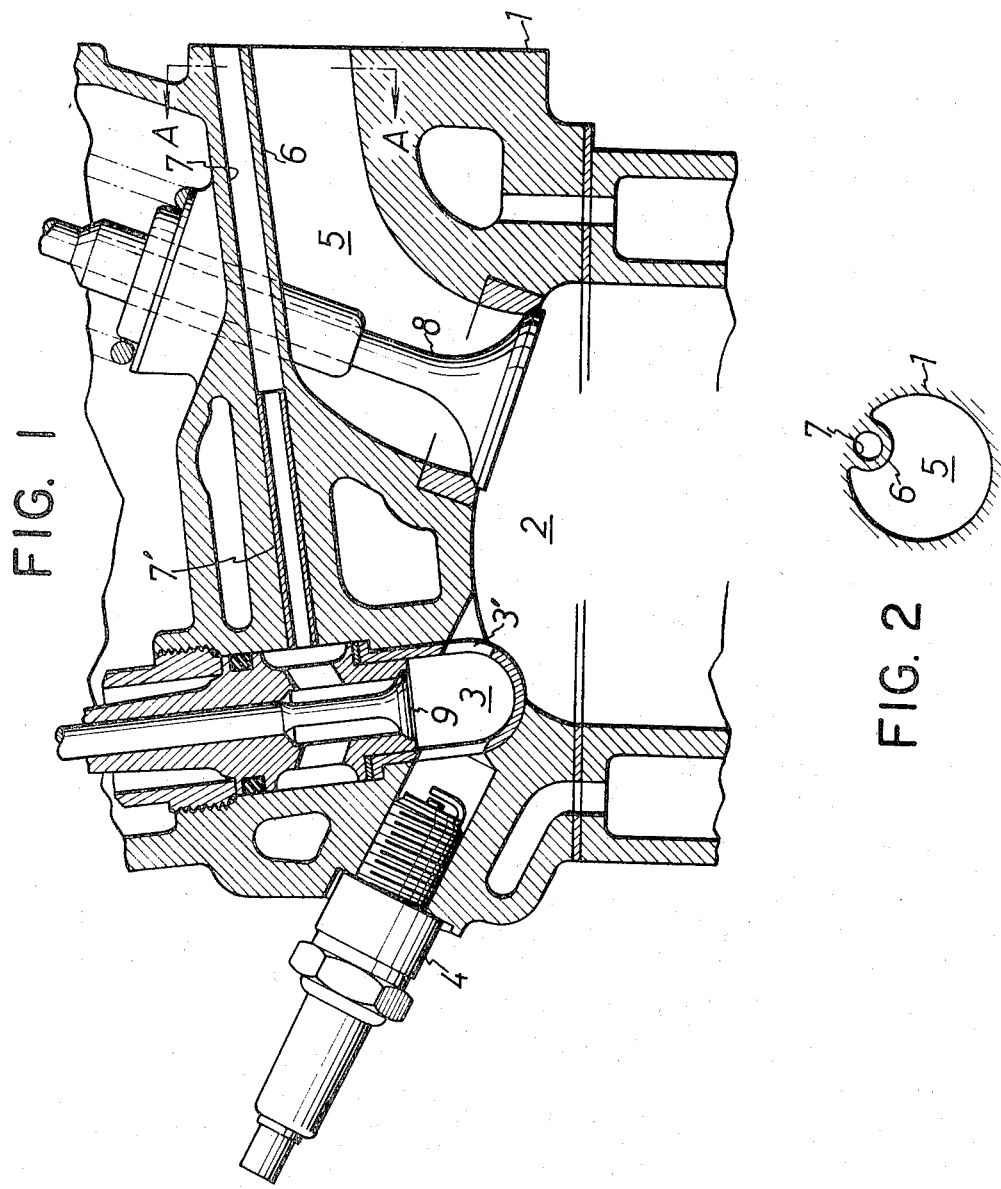

DEVICE FOR ACCELERATING FUEL VAPORIZATION IN AN INTERNAL COMBUSTION ENGINE

The invention relates to an improved intake and exhaust configuration for internal combustion engines, particularly of the type of engine having a main combustion chamber and an auxiliary combustion chamber, the two chambers connected by a passage called a torch nozzle. A spark plug in the auxiliary chamber ignites a relatively rich mixture supplied thereto, and the flame of that combustion issues through the torch nozzle to ignite and burn the relatively lean mixture supplied to the main chamber.

The mixture supplied to the auxiliary chamber is made quite rich so that it can be easily ignited by the electrical spark, but since the intake passage to the auxiliary chamber is relatively narrow and the size of the chamber small, it frequently occurs that the fuel in the mixture condenses on the inner walls of the passage and of the chamber thereby altering the ratio of the fuel-air mixture with the result that a strong torch flame may not be obtained from the auxiliary chamber and, in addition, there is incomplete combustion of the condensed fuel. A further problem is that some of the fuel may condense upon the electrode of the spark plug resulting in a decrease in spark performance. All of these situations are most pronounced when the engine is operating in cold temperatures, and particularly when the engine is started from a cold condition in which fuel vaporization is not easily maintained. As a result of these factors, poor combustion occurs within the auxiliary chamber giving a resultant loss of fuel economy and an increase in the emission of unburned hydrocarbons in the exhaust.

To minimize the unburned hydrocarbons emitted in the exhaust, the mixture supplied to the main chamber is made extremely lean but it is necessary to obtain a more complete combustion within the auxiliary chamber to further reduce the emission of unburned hydrocarbons. It has been found that the latter can be achieved by improving the vaporization of the mixture supplied to the auxiliary chamber.

In accordance with this invention, a novel intake and exhaust configuration is employed which utilizes the heat in the exhaust passage to improve vaporization of the fuel mixture. Specifically, a substantial portion of the length of the auxiliary intake passage is integrally formed within the exhaust passage providing a substantial portion of the external wall thereof exposed to the interior of the exhaust passage where the hot exhaust gases will heat the intake passage. The remaining portion of the intake passage which is not coextensive with the exhaust passage but instead passes through the cylinder head is provided with an insulating sleeve which insulates the warm gases from the relatively cool engine block so that the initially warm and vaporized mixture will reach the auxiliary chamber in the vaporized state and will not be cooled off by the cylinder head.

It is a principle object of the present invention to reduce the quantity of unburned hydrocarbons emitted from an internal combustion engine by improving the vaporization of the rich fuel mixture being supplied through the auxiliary intake passage. It is also an object of the present invention to increase the fuel economy of the internal combustion engine through the use of an auxiliary intake passage which is heated by the exhaust gases so as to vaporize the fuel mixture prior to ignition.

These and other objects and advantages of the present invention will be readily apparent upon reading the following detailed description in conjunction with the accompanying drawings.

FIG. 1 is a sectional side view of a portion of an internal combustion engine incorporating the integral auxiliary intake and exhaust passage.

FIG. 2 is a sectional elevation taken along line A—A of FIG. 1.

Referring now in detail to the drawings, 1 designates the cylinder head having a main combustion chamber 2 and an auxiliary combustion chamber 3, the combustion chambers being in communication through a torch nozzle 3'. A spark plug 4 is situated such that it is in communication with the auxiliary chamber 3. An exhaust passage 5 is shown in communication with the main chamber 2 and this exhaust passage is controlled by exhaust valve 8. The main intake passage and the associated intake valve are not shown in the present drawing. The auxiliary intake passage 7 is shown in communication with the auxiliary combustion chamber 3 controlled by the auxiliary intake valve 9. The auxiliary intake passage 7 has a substantial portion of its length coextensive with the length of the exhaust passage 5, and as may be seen in FIG. 2, is formed having a substantial portion of the peripheral wall 6 exposed within the interior of the exhaust passage 5. This wall portion 6 projects substantially into exhaust passage 5 and is formed having a relatively thin wall so that the heat of the exhaust gases is readily transferred to the intake passage.

As the auxiliary intake passage 7 extends past the point where the exhaust passage 5 is coextensive therewith, the remaining portion extends through a portion of the cylinder head 1. A heat insulating sleeve 7' is inserted in that remaining portion of passage 7. This heat insulating sleeve 7' is formed of a material different from that of the cylinder head so that the mixture within the passage 7 after having been heated by the exhaust gases in passage 5 will not thereafter be cooled by the cylinder head 1 before reaching the auxiliary chamber 3.

The main intake passage (not shown) and the auxiliary intake passage 7 are each coupled upstream to the main carburetor (not shown) which produces a lean mixture of fuel and air, and to a auxiliary carburetor (not shown) which produces a rich fuel-air mixture. During operation of the engine, the rich mixture is supplied to the auxiliary chamber 3 and the lean mixture is supplied to the main chamber 2 and near the end of the compression stroke, the spark plug ignites the rich mixture in the auxiliary chamber producing a flame which is jetted into the main combustion chamber 2 to ignite the lean mixture therein. In this manner, the engine is able to be operated with a mixture which is extremely lean as a whole. As the initial exhaust gases heat up the projected area of the auxiliary intake passage 7 by being in contact with a substantial portion of the external wall thereof, the auxiliary intake passage 7 will be maintained at a high temperature. In this manner, the auxiliary chamber is supplied with a rich fuel mixture delivered in a well vaporized state.

Having described a single embodiment of the present invention, it will be apparent that changes and modifications may be made therein without departing from the scope and spirit thereof, this invention being limited by he lawful scope of the appended claims.

I claim:

1. In an internal combustion engine of the type having a cylinder head with a combustion chamber formed therein, the combination comprising:

means forming an intake conduit in said cylinder head for passing a fuel mixture to said chamber, means forming an exhaust conduit in said cylinder head for passing exhaust gases from said chamber, a first portion of said intake conduit being coextensive with a portion of said exhaust conduit, said intake conduit having a peripheral wall a substantial portion of which extends into said exhaust conduit in heat transferring relationship, a second portion of said intake conduit not being coextensive with said exhaust conduit and extending through said cylinder head, a heat insulating sleeve disposed within said second portion of said intake conduit.

2. The combination set forth in claim 1 wherein said intake conduit has a diameter which is less than that of said exhaust conduit and wherein said peripheral wall is relatively thin.

3. In an internal combustion engine of the type having a cylinder head with a main combustion chamber and an auxiliary combustion chamber, the combination comprising:

means integrally forming an exhaust conduit in said cylinder head for passing exhaust gases from said main combustion chamber, means integrally forming an intake conduit in said cylinder head for passing a fuel mixture to said auxiliary combustion chamber, a first portion of said intake conduit being longitudinally coextensive with a portion of said exhaust conduit, said intake conduit having a peripheral wall a portion of which is coextensive with a peripheral wall of said exhaust conduit, a further portion of the peripheral wall of said intake conduit, residing within said exhaust conduit in heat transferring relationship, a second portion of said intake conduit extending through said cylinder head, a heat insulating sleeve disposed within said second portion of said intake conduit.

* * * * *